(12) United States Patent
Hirose et al.

(10) Patent No.: US 8,668,226 B2
(45) Date of Patent: Mar. 11, 2014

(54) STEERING APPARATUS AND CONNECTOR

(71) Applicant: JTEKT Corporation, Osaka (JP)

(72) Inventors: Kei Hirose, Yokohama (JP); Yoshiaki Takagi, Yokohama (JP)

(73) Assignee: Jtekt Corporation, Osaka-Shi (JP)

( * ) Notice: Subject to any disclaimer, the term of this patent is extended or adjusted under 35 U.S.C. 154(b) by 1 day.

(21) Appl. No.: 13/743,875

(22) Filed: Jan. 17, 2013

(65) Prior Publication Data

US 2013/0199867 A1 Aug. 8, 2013

(30) Foreign Application Priority Data

Feb. 7, 2012 (JP) ................................. 2012-023881

(51) Int. Cl.
*B62D 1/18* (2006.01)
(52) U.S. Cl.
USPC ............... 280/775; 280/777; 74/493; 74/494; 74/495; 74/527
(58) Field of Classification Search
USPC ............. 280/775, 777; 74/493, 494, 495, 527
See application file for complete search history.

(56) References Cited

U.S. PATENT DOCUMENTS

| | | | |
|---|---|---|---|
| 5,651,687 A * | 7/1997 | Du-Rocher et al. | 439/164 |
| 5,820,163 A * | 10/1998 | Thacker et al. | 280/775 |
| 6,035,739 A * | 3/2000 | Milton | 74/493 |
| 6,267,528 B1 * | 7/2001 | Higashino | 403/359.5 |
| 6,517,381 B2 * | 2/2003 | Kondo | 439/604 |
| 7,174,804 B2 * | 2/2007 | Adoline et al. | 74/493 |
| 7,178,422 B2 * | 2/2007 | Armstrong et al. | 74/493 |
| 7,424,835 B2 * | 9/2008 | Adoline et al. | 74/493 |
| 7,601,037 B2 * | 10/2009 | Telakowski et al. | 439/879 |
| 2005/0172751 A1 * | 8/2005 | Hong et al. | 74/493 |
| 2011/0308348 A1 | 12/2011 | Ichie et al. | |

OTHER PUBLICATIONS

Jun. 6, 2013 Extended European Search Report issued in European Application No. EP 13152892.9.

* cited by examiner

*Primary Examiner* — Toan To
(74) *Attorney, Agent, or Firm* — Oliff PLC

(57) ABSTRACT

A steering apparatus includes a wire fitting bracket that is fitted to an end portion of a connecting wire for connecting an outer tube to an inner tube and that has a bracket body and a plurality of protrusions. The bracket body is fitted to a steering column-side member with a bolt, and has a bolt insertion hole through which the bolt is passed. The protrusions protrude from the bracket body, and are arranged around an axis of the bolt insertion hole. The protrusions are formed of rotation restricting protrusions that restrict rotation of the wire fitting bracket and an erroneous fitting prevention protrusion that prevents erroneous fitting of the wire fitting bracket.

6 Claims, 3 Drawing Sheets

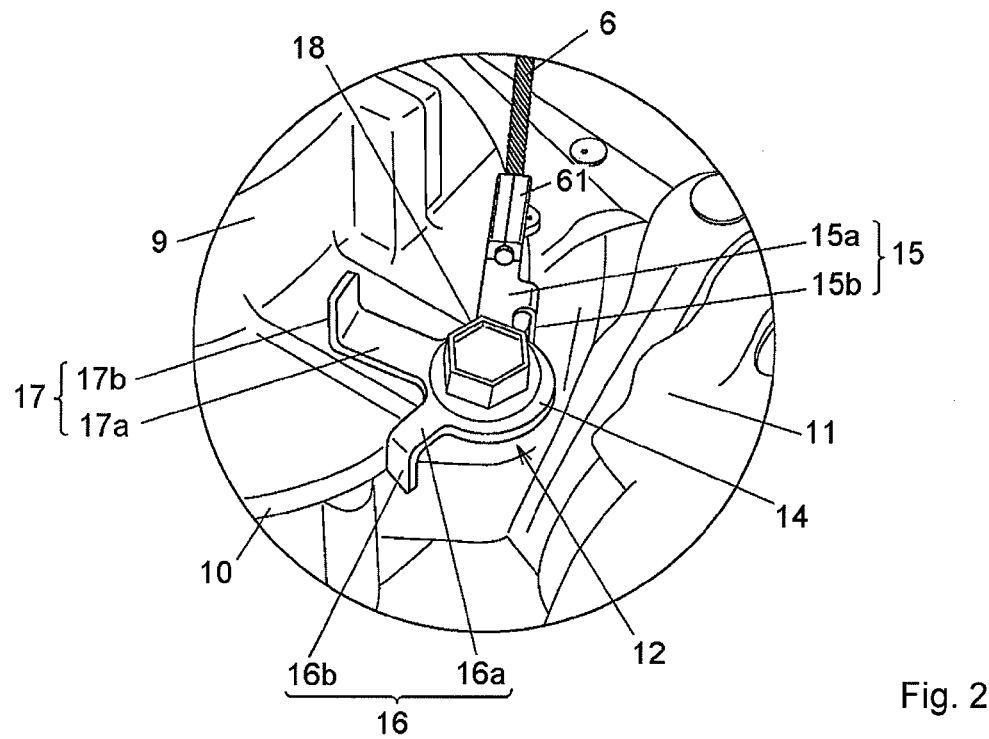
Fig. 2
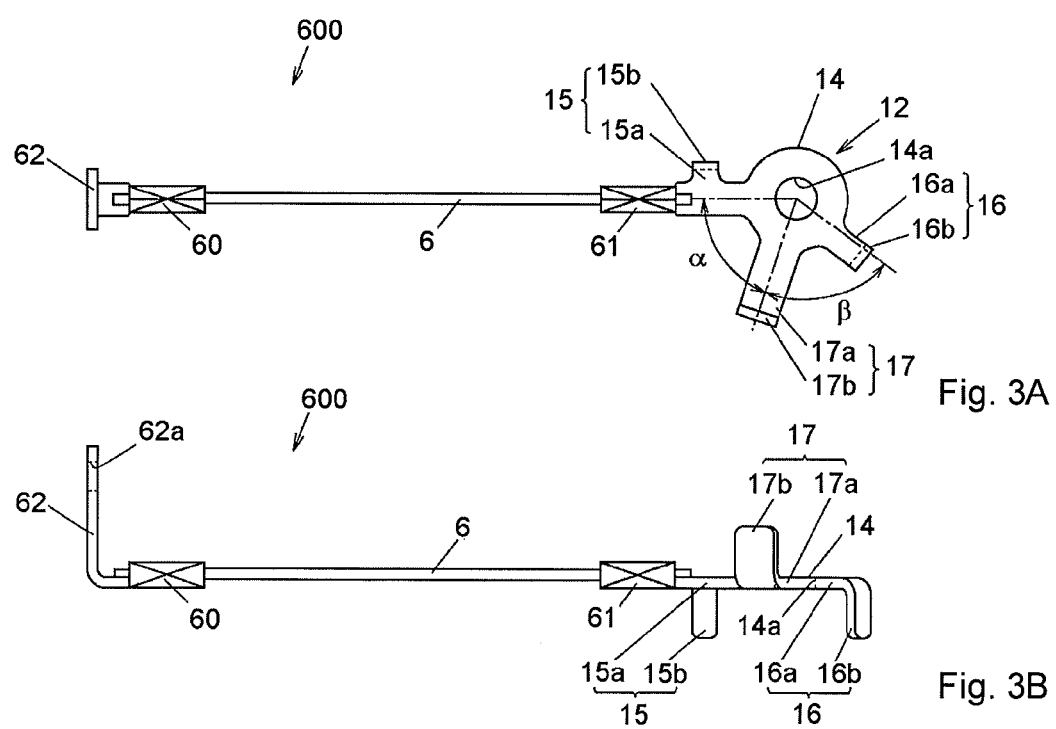
Fig. 3A
Fig. 3B

STEERING APPARATUS AND CONNECTOR

INCORPORATION BY REFERENCE/RELATED APPLICATION

This application claims priority to Japanese Patent Application No. 2012-023881 filed on Feb. 7, 2012 the disclosure of which, including the specification, drawings and abstract, is incorporated herein by reference in its entirety.

BACKGROUND OF THE INVENTION

1. Field of the Invention

The invention relates to a steering apparatus that has a telescopic adjustment function of adjusting a position of a steering wheel in the vehicle longitudinal direction, and a connector.

2. Discussion of Background

US 2011/308348 A1 suggests a steering apparatus that includes: a steering column having two tubes (an inner tube that is a front-side tube and an outer tube that is a rear-side tube located rearward of the front-side tube in the vehicle longitudinal direction) that move relative to each other in the axial direction of a steering shaft through telescopic adjustment; and a connecting wire that is used to connect the inner tube and the outer tube of the steering column to each other and to prevent disconnection of the tubes.

The steering column is arranged on the vehicle body side so as to be extendible in the axial direction of the steering shaft. The steering column is configured to extend or contract through relative movement between the inner tube and the outer tube.

One end portion of the connecting wire is fitted to the inner tube, and the other end portion of the connecting wire is fitted to the outer tube.

The inner tube and the outer tube of the thus configured steering apparatus are coupled to each other by fitting the one end portion of the connecting wire to the inner tube and fitting the other end portion of the connecting wire to the outer tube.

In the thus configured steering apparatus, for example, as shown in FIG. 5A and FIG. 5B, when tubes (not shown) are connected to each other, a wire fitting bracket 200 having rotation restricting protrusions 200a, 200b and a bolt insertion hole 200c is fitted in advance to each end portion of a connecting wire 201, then a bolt (not shown) is passed through the bolt insertion hole 200c, and the wire fitting bracket 200 is fitted to the corresponding tube with the bolt. At this time, in order to avoid loosening of the bolt due to rotation of the wire fitting bracket 200, which is caused by pulling the connecting wire 201, the rotation restricting protrusions 200a, 200b are engaged with the corresponding tube.

However, in the above-described steering apparatus, with a structure in which the connecting wire 201 is fitted to the corresponding tube just using the wire fitting bracket 200 having the rotation restricting protrusions 200a, 200b, the wire fitting bracket 200 may be fitted to the corresponding tube with the front and back faces inverted (erroneously fitted state). In this case, the rotation restricting protrusions 200a, 200b are not able to function.

Therefore, there has been a demand for a steering apparatus in which erroneous fitting of the wire fitting bracket 200 is prevented when the connecting wire 201 is fitted to the corresponding tube (steering column).

SUMMARY OF THE INVENTION

The invention provides a steering apparatus and a connector with which erroneous fitting of a wire fitting bracket is prevented when the connector is fitted to a steering column.

According to a feature of an example of the invention, a wire fitting bracket has a rotation restricting protrusion that restricts rotation of the wire fitting bracket and an erroneous fitting prevention protrusion that prevents erroneous fitting of the wire fitting bracket.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is a perspective view that shows a state where a connecting wire is fitted in the steering apparatus according to the first embodiment of the invention;

FIG. 3A is a plan view that shows the connecting wire of the steering apparatus according to the first embodiment of the invention;

FIG. 3B is a side view of the connecting wire according to the first embodiment;

DETAILED DESCRIPTION OF EMBODIMENTS

Hereinafter, embodiments of the invention will be described with reference to the accompanying drawings.

Figure 1:
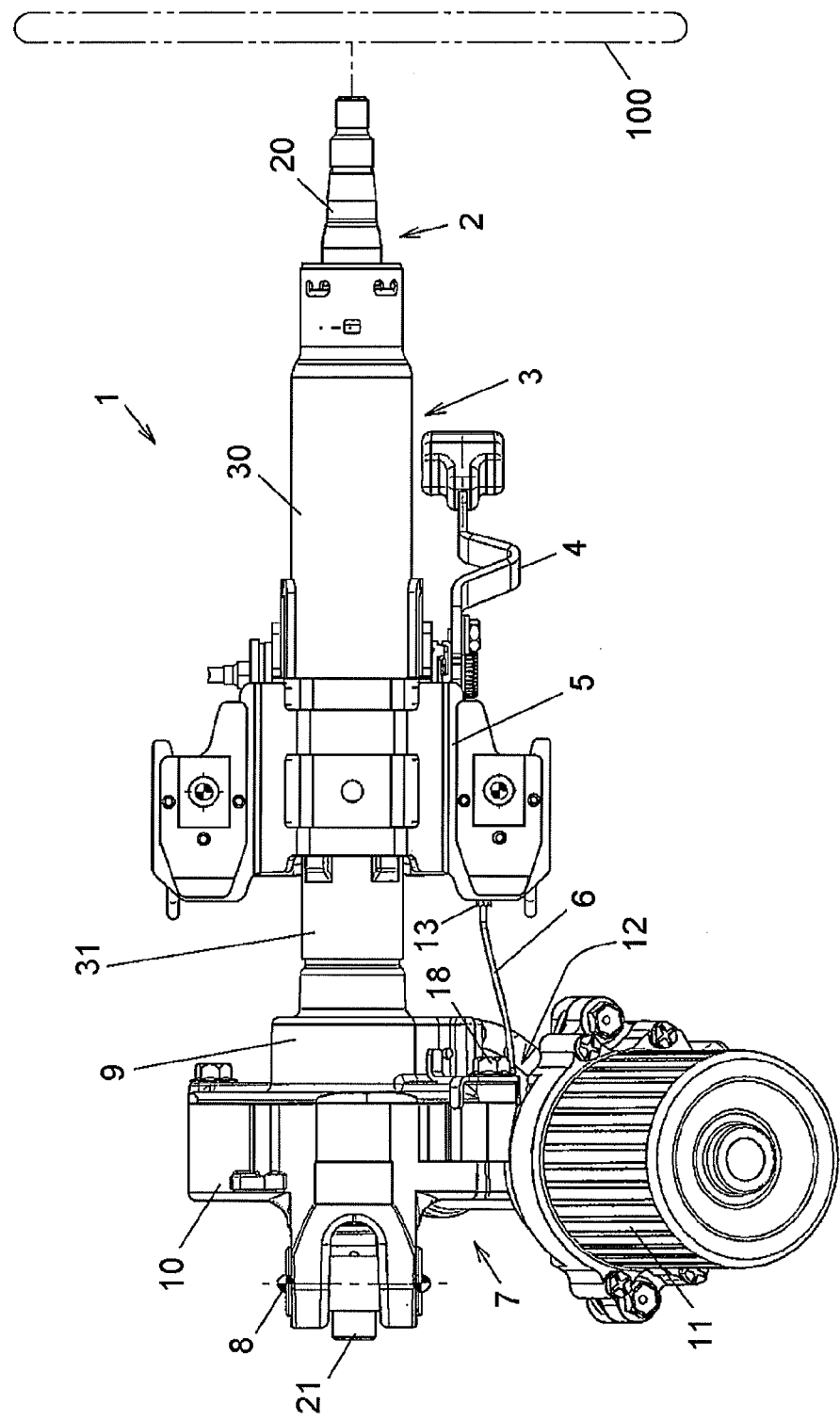
FIG. 1 is a plan view for illustrating the entirety of a steering apparatus according to a first embodiment of the invention.

A steering apparatus 1 according to a first embodiment of the invention will be described with reference to the accompanying drawings. FIG. 1 shows the entirety of the steering apparatus. FIG. 2 shows a state where a connecting wire is fitted. As shown in FIG. 1 and FIG. 2, the steering apparatus 1 mainly includes a steering shaft 2, a steering column (a member to which a bracket body described later is fitted) 3, and an operating lever 4. The steering shaft 2 rotates in response to an operation of rotating a steering wheel 100. The steering shaft 2 is rotatably supported by the steering column 3. The operating lever 4 is used to perform an operation of extending/contracting the steering column 3 (telescopic adjustment) and an operation of pivoting the steering column 3 (tilt adjustment).

The steering shaft 2 has an upper shaft 20 and a lower shaft 21. The steering shaft 2 is supported in the steering column 3 so as to be rotatable about its axis. The steering shaft 2 is coupled to a steering mechanism (not shown). The steering shaft 2 is configured to transmit the rotational force of the steering wheel 100 to the steering mechanism as steering force.

The upper shaft 20 is arranged at an upper side (the steering wheel 100 side) of the steering shaft 2 such that part of the upper shaft 20 is exposed to the outside of the steering column 3. The upper shaft 20 is formed of a cylindrical member, as a whole, which opens toward both sides in the axial direction.

The lower shaft 21 is arranged at a lower side (the steering mechanism side) of the steering shaft 2, and is coupled to the upper shaft 20 so as to be movable relative to the upper shaft 20 along its axis. The lower shaft 21 is coupled to the upper shaft 20 by, for example, spline fitting.

The steering column 3 has an outer tube 30 and an inner tube 31 that are movable relative to each other, and is arranged in front of a vehicle driver seat (not shown). The steering column 3 is configured to support the steering shaft 2 such that the steering shaft 2 is rotatable.

The outer tube 30 is movably fitted to a vehicle body-side column bracket (not shown) via a lock/unlock mechanism housing 5, and is coupled to the inner tube 31 by the connecting wire 6. The outer tube 30 is configured to be movable in its axial direction together with the upper shaft 20. The details of the connecting wire 6 will be described later.

The lock/unlock mechanism housing 5 incorporates a lock/unlock mechanism (not shown) that is used to switch the state of the steering column 3 between a locked state where the extending/contracting operation and the pivoting operation are prohibited and an unlocked state where the extending/contracting operation and the pivoting operation are allowed, through an operation of the operating lever 4. The lock/unlock mechanism housing 5 is fitted to the column bracket.

The inner tube 31 is arranged so as to be movable in its axial direction relative to the outer tube 30, and is supported by the column bracket via an assist mechanism housing 7 so as to be pivotable about a support shaft 8.

The assist mechanism housing 7 is formed of a sensor housing 9 and a speed reducer housing 10, and is arranged around the inner tube 31. The assist mechanism housing 7 is configured to accommodate an assist mechanism (not shown) that applies operation assist force for assisting a steering operation to the steering shaft 2. An electric motor 11 is fitted to the assist mechanism housing 7. The electric motor 11 constitutes the assist mechanism together with a torque sensor (not shown) and a speed reducer (not shown).

The assist mechanism is actuated by an operator's (driver's) operation of the steering wheel 100. When the steering wheel 100 is operated, the electric motor 11 is driven at a predetermined voltage on the basis of values detected by the torque sensor and a vehicle speed sensor. The driving force (rotational force) of the electric motor 11 is transmitted to the steering shaft 2 via the speed reducer, and driver's steering operation is assisted.

The sensor housing 9 incorporates the torque sensor (not shown) that detects steering torque. The sensor housing 9 is arranged around the steering shaft 2, and the sensor housing 9 is formed of a cylindrical member as a whole.

The speed reducer housing 10 incorporates the speed reducer (not shown) that reduces the speed of the rotation of the electric motor 11. The speed reducer housing 10 is arranged next to a steering mechanism-side portion of the sensor housing 9, and is formed of a cylindrical member, as a whole, which has an outside diameter that is larger than the outside diameter of the sensor housing 9. The speed reducer housing 10 is configured to function as a wire fitted portion (portion to which a wire fitting bracket 12 described later is fitted) of the steering column 3 (inner tube 31).

The operating lever 4 is pivotably supported by the lock/unlock mechanism housing 5, and is coupled to the lock/unlock mechanism. The operating lever 4 actuates the lock/unlock mechanism through its lever operation (pivoting operation), and is configured to achieve tilt lock and telescopic lock and to cancel the tilt lock and the telescopic lock.

Next, the connecting wire 6 that connects the outer tube 30 to the inner tube 31 and the wire fitting bracket 12 will be described with reference to FIG. 2, FIG. 3A and FIG. 3B. FIG. 3A and FIG. 3B show the connecting wire 6 and the wire fitting bracket 12. The connecting wire 6 and the wire fitting bracket 12 constitute a connector 600.

As shown in FIG. 2, FIG. 3A and FIG. 3B, the connecting wire 6 has terminals 60, 61 at respective end portions, and is formed of a metal wire as a whole. The connecting wire 6 is configured to connect the outer tube 30 and inner tube 31 of the steering column 3 to each other. The wire length of the connecting wire 6 is set to such a length that the inner tube 31 is not disconnected from the outer tube 30.

The terminal 60 is formed of, for example, a metal terminal, and is connected to one end portion of the connecting wire 6 by crimping both side edges of a terminal plate (not shown), which is a material, onto the one end portion of the connecting wire 6. The terminal 60 is fixedly provided with a wire fitting piece 62 by which the wire 6 is fitted to the lock/unlock mechanism housing 5.

The wire fitting piece 62 has a bolt insertion hole 62a that opens at both front and back end faces, and is fastened to the lock/unlock mechanism housing 5 with a bolt 13 that is passed through the bolt insertion hole 62a.

As in the case of the terminal 60, the terminal 61 is formed of a metal terminal, and is fitted to the other end portion of the connecting wire 6 by crimping both side edges of a terminal plate (not shown), which is a material, onto the other end portion of the connecting wire 6. The terminal 61 is provided with the wire fitting bracket 12 by which the wire 6 is connected to the speed reducer housing 10.

The wire fitting bracket 12 has a bracket body 14 and a plurality of protrusions 15 to 17 (rotation restricting protrusions 15, 16 and an erroneous fitting prevention protrusion 17). The wire fitting bracket 12 is arranged on an axial end face of the speed reducer housing 10, and is formed of a metal piece as a whole. The wire fitting bracket 12 may be formed of a resin piece instead of a metal piece. The wire fitting bracket 12 is applied to the connecting wire 6 that connects the outer tube 30 of the steering column 3 to the inner tube 31 of the steering column 3 in a right-hand drive vehicle (vehicle in which a driver seat is located on the right side with respect to a travel direction of the vehicle).

The bracket body 14 has a bolt insertion hole 14a through which a bolt 18 is passed. The bracket body 14 is arranged so as to be in contact with the axial end face of the speed reducer housing 10, and is fitted to the speed reducer housing 10 by the bolt 18 in a state where the bracket body 14 is positioned on the axial end face. The bracket body 14 is formed of a metal sheet member as a whole.

The protrusions 15 to 17 are arranged at positions that are located at predetermined intervals in the circumferential direction of the bracket body 14 (around the axis of the bolt insertion hole 14a). An angle α formed between the rotation restricting protrusion 15 (base portion 15a) and the erroneous fitting prevention protrusion 17 (base portion 17a) and an angle β formed between the rotation restricting protrusion 16 (base portion 16a) and the erroneous fitting prevention protrusion 17 (base portion 17a) are set, for example, such that α, β≈71°.

The rotation restricting protrusion 15 has the base portion 15a and a rotation restricting lug 15b. The rotation restricting protrusion 15 is arranged so as to be in contact with the speed reducer housing 10, and is formed integrally with the outer peripheral edge of the bracket body 14. The rotation restricting protrusion 15 is configured to restrict rotation of the wire fitting bracket 12 in a first direction.

The base portion 15a protrudes in a radial direction of the bracket body 14 (direction in which the connecting wire 6 extends from the wire fitting bracket 12), and is arranged on the axial end face of the speed reducer housing 10. The base portion 15a is fitted to the back face of the terminal 61, and is formed of a rectangular piece as a whole.

The rotation restricting lug 15b is engaged with the outer periphery (side face) of the speed reducer housing 10 (arranged in a state where the rotation restricting lug 15b is positioned). The rotation restricting lug 15b protrudes from the back face of the base portion 15a, and is formed by bending at one side edge (upper side edge in FIG. 3A) of the base portion 15a. The rotation restricting lug 15b restricts rotation of the wire fitting bracket 12 in the first direction. The rotation restricting lug 15b is configured to function as a positioning lug for positioning the wire fitting bracket 12 with respect to the speed reducer housing 10.

The rotation restricting protrusion 16 has the base portion 16a and a rotation restricting lug 16b. The rotation restricting protrusion 16 is arranged so as to be in contact with the speed reducer housing 10, and is formed integrally with one side (lower side in FIG. 3A) of the outer peripheral edge of the bracket body 14. The rotation restricting protrusion 16 is configured to restrict rotation of the wire fitting bracket 12 in a second direction.

The base portion 16a protrudes in a radial direction of the bracket body 14, and is arranged lateral to the speed reducer housing 10. The base portion 16a is formed of a rectangular piece as a whole.

The rotation restricting lug 16b is engaged with the outer periphery (side face) of the speed reducer housing 10 (arranged in a state where the rotation restricting lug 16b is positioned). The rotation restricting lug 16b protrudes from the back face of the base portion 16a and is formed by bending at a distal end edge of the base portion 16a. The rotation restricting lug 16b restricts rotation of the wire fitting bracket 12 in the second direction. The rotation restricting lug 16b is configured to function as a positioning lug for positioning the wire fitting bracket 12 with respect to the speed reducer housing 10. With this configuration, even when a working space where a work for fitting the fitting bracket 12 to the speed reducer housing 10 is performed is small, it is possible to reliably fit the wire fitting bracket 12 to the speed reducer housing 10 by positioning the rotation restricting lug 16b together with the rotation restricting lug 15b with respect to the speed reducer housing 10 around a fitting center of the bracket body 14 (around the axis of the bolt insertion hole 14a).

The erroneous fitting prevention protrusion 17 has the base portion 17a and an erroneous fitting prevention lug 17b. The erroneous fitting prevention protrusion 17 is arranged so as to protrude toward the sensor housing 9. The erroneous fitting prevention protrusion 17 is formed integrally with at one side (lower side in FIG. 3A) of the outer peripheral edge of the bracket body 14, at a position between the rotation restricting protrusion 15 and the rotation restricting protrusion 16.

The base portion 17a protrudes in a radial direction of the bracket body 14, and is arranged on the axial end face of the speed reducer housing 10. The base portion 17a is formed of a rectangular piece as a whole.

The erroneous fitting prevention lug 17b is arranged so as to be oriented toward the outer periphery (side face) of the sensor housing 9. The erroneous fitting prevention lug 17b protrudes from the surface of the base portion 17a in a direction opposite to the direction in which the rotation restricting lugs 15b, 16b protrude, and is formed by bending at the distal end edge of the base portion 17a. The erroneous fitting prevention lug 17b is configured so as to contact the axial end face of the speed reducer housing 10 or another member (for example, the electric motor 11) when the wire fitting bracket 12 is positioned in a state where the front and back faces of the wire fitting bracket 12 are inverted. With this configuration, it is possible to prevent erroneous fitting of the wire fitting bracket 12 to the speed reducer housing 10.

Next, a method of connecting the outer tube 30 of the steering column 3 to the inner tube 31 of the steering column 3 in the steering apparatus 1 according to the embodiment (tube connecting method) will be described.

In the tube connecting method according to the present embodiment, a process of "fitting the wire fitting bracket" and a process of "fitting the wire fitting piece" are carried out in this order. Therefore, these processes will be described in this order.

First, the rotation restricting lugs 15b, 16b of the wire fitting bracket 12 are positioned on the outer periphery (engagement positions) of the speed reducer housing 10, and the back face of the bracket body 14 is arranged on the axial end face (bracket connecting portion) of the speed reducer housing 10 such that the bolt insertion hole 14a coincides with a threaded hole (not shown) of the speed reducer housing 10. At this time, the wire fitting bracket 12 is arranged in a state where the base portion 17a of the erroneous fitting prevention protrusion 17 is in contact with the axial end face of the speed reducer housing 10 and the erroneous fitting prevention lug 17b is not in contact with the axial end face of the speed reducer housing 10. If the wire fitting bracket 12 is arranged in a state where the base portion 17a is not in contact with the axial end face of the speed reducer housing 10 and the erroneous fitting prevention lug 17b is in contact with the axial end face of the speed reducer housing 10, the front and back faces of the wire fitting bracket 12 are inverted (erroneous fitting state), and the rotation restricting protrusions 15, 16 are not able to function.

Subsequently, the bolt 18 is passed through the bolt insertion hole 14a of the bracket body 14, and is then screwed into the threaded hole of the speed reducer housing 10. In this case, when the bolt 18 is screwed to the threaded hole of the speed reducer housing 10, the wire fitting bracket 12, that is, one end portion of the connecting wire 6, is fitted to the speed reducer housing 10.

First, the back face of the wire fitting piece 62 is arranged on the axial end face of the lock/unlock mechanism housing 5 such that the bolt insertion hole 62a coincides with a threaded hole (not shown) of the lock/unlock mechanism housing 5.

Subsequently, the bolt 13 is passed through the bolt insertion hole 62a of the wire fitting piece 62, and is then screwed into the threaded hole of the lock/unlock mechanism housing 5. In this case, when the bolt 13 is screwed into the threaded hole of the lock/unlock mechanism housing 5, the wire fitting piece 62, that is, the other end portion of the connecting wire 6, is fitted to the lock/unlock mechanism housing 5.

In this way, the outer tube 30 of the steering column 3 is connected to the inner tube 31 of the steering column 3. Note that, in the present embodiment, the description is made on the case where the process of "fitting the wire fitting bracket" and the process of "fitting the wire fitting piece" are carried out in this order. Alternatively, the process of "fitting the wire fitting piece" and the process of "fitting the wire fitting bracket" may be carried out in this order.

According to the above-described first embodiment, the following advantageous effects are obtained.

(1) If the wire fitting bracket 12 is positioned in a state where the front and back faces of the wire fitting bracket 12 are inverted (erroneous fitting state), the erroneous fitting prevention lug 17b contacts the axial end face of the speed reducer housing 10 or another member (for example, the electric motor 11) and the erroneous fitting of the wire fitting bracket 12 to the speed reducer housing 10 is detected. Therefore, it is possible to avoid the erroneous fitting of the wire fitting bracket 12 when the connecting wire 6 is connected to the steering column 3 (the outer tube 30 and the inner tube 31).

(2) Because the rotation restricting protrusions 15, 16 and the erroneous fitting prevention protrusion 17 are formed integrally with the bracket body 14 so as to protrude in different directions, the rotation restricting protrusions 15, 16 and the erroneous fitting prevention protrusion 17 are located at different positions when the wire fitting bracket 12 is fitted to the speed reducer housing 10. Therefore, it is possible to fit the wire fitting bracket 12 to the speed reducer housing 10 by utilizing a relatively narrow space.

(3) Because the rotation restricting lugs 15b, 16b and the erroneous fitting prevention lug 17b are formed so as to protrude in opposite directions, it is possible to fulfill both the function of the rotation restricting lugs 15b, 16b and the function of the erroneous fitting prevention lug 17b.

(4) The bracket body 14 and the rotation restricting protrusions 15, 16 are arranged so as to contact the speed reducer housing 10 and the erroneous fitting prevention protrusion 17 is arranged so as to protrude toward the sensor housing 9. Therefore, it is possible to connect the wire fitting bracket 12 to the speed reducer housing 10 by utilizing a space that is formed between the speed reducer housing 10 and the sensor housing 9.

(5) Because the bracket body 14 is arranged on the axial end face of the speed reducer housing 10 in a state where the rotation restricting protrusions 15, 16 are positioned on the side face of the speed reducer housing 10, the rotation restricting protrusions 15, 16 function as positioning protrusions in a state where the bracket body 14 is arranged on the axial end face of the speed reducer housing 10. Therefore, it is possible to easily fit the wire fitting bracket 12 to the speed reducer housing 10.

(6) Because the rotation restricting protrusions 15, 16 are arranged around the axis of the bolt insertion hole 14a, it is possible to position the wire fitting bracket 12 in two directions around the axis of the bolt insertion hole 14a when the wire fitting bracket 12 is fitted to the speed reducer housing 10.

Note that, in the present embodiment, the description is made on the case where, when the wire fitting bracket 12 is fitted to the speed reducer housing 10 in the right-hand drive vehicle, erroneous fitting of the wire fitting bracket 12 is detected. In addition, it is possible to detect erroneous fitting of the wire fitting bracket 12 when the wire fitting bracket 12 is fitted to a speed reducer housing in a left-hand drive vehicle (vehicle in which a driver seat is located on the left side with respect to the travel direction of the vehicle).

Figure 4A:
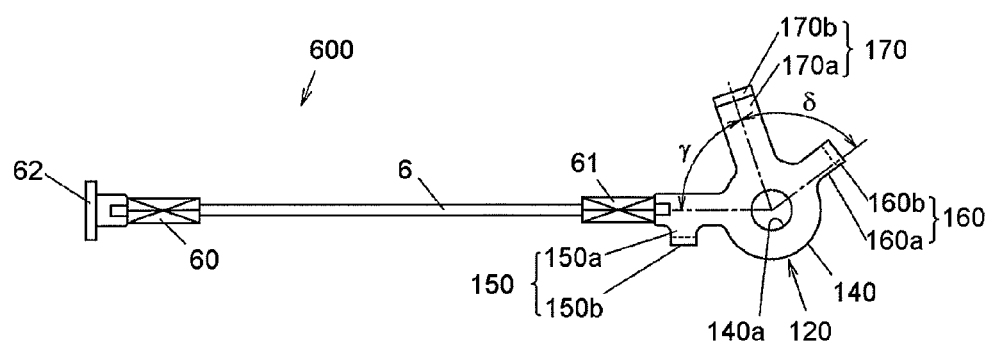
FIG. 4A is a plan view that shows a connecting wire of a steering apparatus according to a second embodiment of the invention.
Figure 4B:
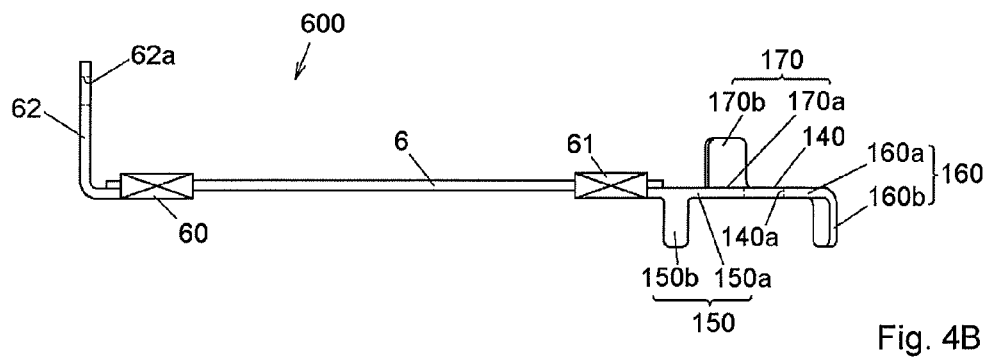
FIG. 4B is a side view of the connecting wire according to the second embodiment.
Figure 5A:
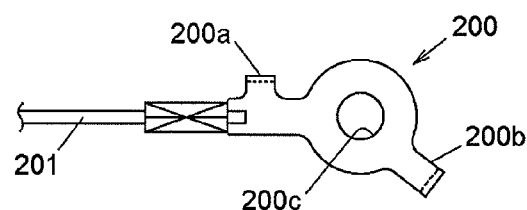
FIG. 5A is a plan view that shows a connecting wire with a rotation restricting function in a steering apparatus according to related art.
Figure 5B:
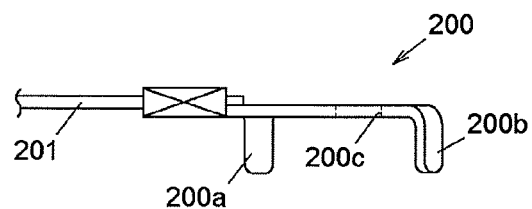
FIG. 5B is a side view of the connecting wire according to the related art.

Next, a steering apparatus (wire fitting bracket, etc.) according to a second embodiment of the invention will be described with reference to FIG. 4A and FIG. 4B. FIG. 4A and FIG. 4B show a connecting wire and the wire fitting bracket. In FIG. 4A and FIG. 4B, the same reference numerals as those in FIG. 3A and FIG. 3B are assigned to the connecting wire, the wire fitting piece, etc., and the detailed description thereof is omitted.

As shown in FIG. 4A and FIG. 4B, a wire fitting bracket 120 of the steering apparatus according to the second embodiment of the invention is characterized in that the wire fitting bracket 120 is applied to the connecting wire 6 that connects the outer tube 30 of the steering column 3 to the inner tube 31 of the steering column 3 in a left-hand drive vehicle.

The wire fitting bracket 120 has a bracket body 140 and a plurality of protrusions 150, 160, 170 (rotation restricting protrusions 150, 160 and an erroneous fitting prevention protrusion 170). The wire fitting bracket 120 is arranged on an axial end face of the speed reducer housing 10, and is formed of a metal piece as a whole. The wire fitting bracket 120 may be formed of a resin piece instead of the metal piece.

The bracket body 140 has a bolt insertion hole 140a through which the bolt 18 is passed. The bracket body 140 is arranged so as to be in contact with the axial end face of the speed reducer housing 10, and is fitted to the speed reducer housing 10 in a state where the bracket body 140 is positioned on the axial end face. The bracket body 140 is formed of a metal sheet member as a whole.

The protrusions 150, 160, 170 are arranged at positions that are located at predetermined intervals in the circumferential direction of the bracket body 140 (around the axis of the bolt insertion hole 140a). An angle $\gamma$ formed between the rotation restricting protrusion 150 (base portion 150a) and the erroneous fitting prevention protrusion 170 (base portion 170a) and an angle $\delta$ formed between the rotation restricting protrusion 160 (base portion 160a) and the erroneous fitting prevention protrusion 170 (base portion 170a) are set, for example, such that $\gamma, \delta \approx 71°$.

The rotation restricting protrusion 150 has the base portion 150a and a rotation restricting lug 150b. The rotation restricting protrusion 150 is arranged so as to be in contact with the speed reducer housing 10, and is formed integrally with the outer peripheral edge of the bracket body 140. The rotation restricting protrusion 150 is configured to restrict rotation of the wire fitting bracket 120 in a first direction.

The base portion 150a protrudes in a radial direction of the bracket body 140 (direction in which the connecting wire 6 extends from the wire fitting bracket 120), and is arranged on the axial end face of the speed reducer housing 10. The base portion 150a is fitted to the back face of the terminal 61, and is formed of a rectangular piece as a whole.

The rotation restricting lug 150b is engaged with the outer periphery (side face) of the speed reducer housing 10 (arranged in a state where the rotation restricting lug 150b is positioned). The rotation restricting lug 150b protrudes from the back face of the base portion 150a, and is formed by bending at its other side edge (lower side edge in FIG. 4A). The rotation restricting lug 150b restricts rotation of the wire fitting bracket 120 in the first direction. The rotation restricting lug 150b is configured to function as a positioning lug for positioning the wire fitting bracket 120 with respect to the speed reducer housing 10.

The rotation restricting protrusion 160 has the base portion 160a and a rotation restricting lug 160b. The rotation restricting protrusion 160 is arranged so as to be in contact with the speed reducer housing 10, and is formed integrally with the other side (upper side in FIG. 4A) of the outer peripheral edge of the bracket body 140. The rotation restricting protrusion 160 is configured to restrict rotation of the wire fitting bracket 120 in a second direction.

The base portion 160a protrudes in a radial direction of the bracket body 140, and is arranged lateral to the speed reducer housing 10. The base portion 160a is formed of a rectangular piece as a whole.

The rotation restricting lug 160b is engaged with the outer periphery (side face) of the speed reducer housing 10 (arranged in a state where the rotation restricting lug 160b is positioned). The rotation restricting lug 160b protrudes from the back face of the base portion 160a, and is formed by bending at its distal end edge. The rotation restricting lug 160b restricts rotation of the wire fitting bracket 120 in the second direction. The rotation restricting lug 160b is configured to function as a positioning piece for positioning the wire fitting bracket 120 with respect to the speed reducer housing 10. With this configuration, when the wire fitting bracket 120 is fitted to the speed reducer housing 10, it is possible to reliably fit the wire fitting bracket 120 to the speed reducer housing 10 by positioning the rotation restricting lug 160b together with the rotation restricting lug 150b with respect to the speed reducer housing 10 around a fitting center of the bracket body 140 (around the axis of the bolt insertion hole 140a).

The erroneous fitting prevention protrusion 170 has the base portion 170a and an erroneous fitting prevention lug 170b. The erroneous fitting prevention protrusion 170 is arranged so as to protrude toward the side face of the sensor housing 9. The erroneous fitting prevention protrusion 170 is formed integrally with the other side (upper side in FIG. 4A) of the outer peripheral edge of the bracket body 140, at a position between the rotation restricting protrusion 150 and the rotation restricting protrusion 160.

The base portion 170a protrudes in a radial direction of the bracket body 140, and is arranged on the axial end face of the speed reducer housing 10. The base portion 170a is formed of a rectangular piece as a whole.

The erroneous fitting prevention lug 170b is arranged so as to be oriented toward the outer periphery (side face) of the sensor housing 9. The erroneous fitting prevention lug 170b protrudes from the surface of the base portion 170a in a direction opposite to the direction in which the rotation restricting lugs 150b, 160b protrude, and is formed by bending at its distal end edge. The erroneous fitting prevention lug 170b is configured to contact the axial end face of the speed reducer housing 10 or another member when the wire fitting bracket 120 is positioned in a state where the front and back faces of the wire fitting bracket 120 are inverted. With this configuration, erroneous fitting of the wire fitting bracket 120 to the speed reducer housing 10 is detected.

A method of connecting the outer tube 30 of the steering column 3 to the inner tube 31 of the steering column 3 in the steering apparatus according to the present embodiment (tube connecting method) is substantially the same as the tube connecting method according to the first embodiment. Therefore, the description thereof is omitted.

According to the above-described second embodiment, the same advantageous effects as those in the first embodiment are obtained.

Note that, in the present embodiment, the description is made on the case where, when the wire fitting bracket 120 is fitted to the speed reducer housing 10 in the left-hand drive vehicle, erroneous fitting of the wire fitting bracket 120 is detected. In addition, it is possible to detect erroneous fitting of the wire fitting bracket 120 when the wire fitting bracket 120 is fitted to a speed reducer housing in a right-hand drive vehicle.

The steering apparatus and the connector according to the invention are described on the basis of the above embodiments. However, the invention is not limited to the above-described embodiments, and may be implemented in various other embodiments without departing from the scope of the invention. For example, the following modifications may be made.

In the above-described embodiments, the description is made on the case where the wire fitting piece 62 is fitted to the one end portion of the connecting wire 6 and the wire fitting bracket 12 (120) is fitted to the other end portion of the connecting wire 6. However, the invention is not limited to this configuration. The wire fitting bracket 12 (120) may befitted to one end portion or each of both end portions of the connecting wire 6.

In the above-described embodiments, the description is made on the case where a member to which the bracket body 14 (140) is fitted is the steering column 3 (the outer tube 30 and the inner tube 31) of the steering apparatus 1. However, the invention is not limited to this configuration. A member to which the bracket body 14 (140) is fitted may be other than the steering column.

What is claimed is:

1. A steering apparatus, comprising:
   a steering column that has a pair of tubes that are movable relative to each other, and that supports a steering shaft, which rotates in response to a rotating operation of a steering wheel, such that the steering shaft is rotatable;
   a connecting wire that couples the pair of tubes of the steering column to each other; and
   a wire fitting bracket that is fitted to an end portion of the connecting wire, and that has a bracket body and a plurality of protrusions, wherein
   in the wire fitting bracket,
   the bracket body is fitted to the steering column side with a bolt, and has a bolt insertion hole through which the bolt is passed, and
   the protrusions protrude from the bracket body and are arranged around an axis of the bolt insertion hole, and the protrusions are formed of a rotation restricting protrusion that restricts rotation of the wire fitting bracket and an erroneous fitting prevention protrusion that prevents erroneous fitting of the wire fitting bracket.

2. The steering apparatus according to claim 1, wherein:
   the bracket body of the wire fitting bracket is fitted to a speed reducer housing that accommodates a speed reducer that constitutes an assist mechanism for assisting a steering operation, together with an electric motor and a torque sensor; and
   the rotation restricting protrusion and the erroneous fitting prevention protrusion are formed on the bracket body so as to protrude from the bracket body in different directions.

3. The steering apparatus according to claim 1, wherein:
   in the wire fitting bracket, the rotation restricting protrusion has a rotation restricting lug and the erroneous fitting prevention protrusion has an erroneous fitting prevention lug; and
   the rotation restricting lug and the erroneous fitting prevention lug are formed so as to protrude in opposite directions.

4. The steering apparatus according to claim 2, wherein:
   the bracket body and the rotation restricting protrusion of the wire fitting bracket are arranged so as to be in contact with the speed reducer housing; and
   the erroneous fitting prevention protrusion of the wire fitting bracket is arranged so as to protrude toward a sensor housing that accommodates the torque sensor.

5. The steering apparatus according to claim 4, wherein the wire fitting bracket is arranged in a state where the bracket body is positioned on an end face of the speed reducer housing and the rotation restricting protrusion is positioned on a side face of the speed reducer housing.

6. The steering apparatus according to claim 1, wherein the rotation restricting protrusion of the wire fitting bracket is formed of two protrusions that are arranged at a predetermined interval around a fitting center of the wire fitting bracket.

* * * * *

UNITED STATES PATENT AND TRADEMARK OFFICE
CERTIFICATE OF CORRECTION

| | |
|---|---|
| PATENT NO. | : 8,668,226 B2 |
| APPLICATION NO. | : 13/743875 |
| DATED | : March 11, 2014 |
| INVENTOR(S) | : Kei Hirose et al. |

It is certified that error appears in the above-identified patent and that said Letters Patent is hereby corrected as shown below:

On the Title Page:

(73) Assignee: delete "Jtekt Corporation" and insert -- JTEKT Corporation --, therefor.

Signed and Sealed this
Tenth Day of June, 2014

Michelle K. Lee
*Deputy Director of the United States Patent and Trademark Office*